Feb. 28, 1967    R. E. FROMSON ET AL    3,306,456
SETTLING APPARATUS
Filed Sept. 16, 1964    3 Sheets-Sheet 1
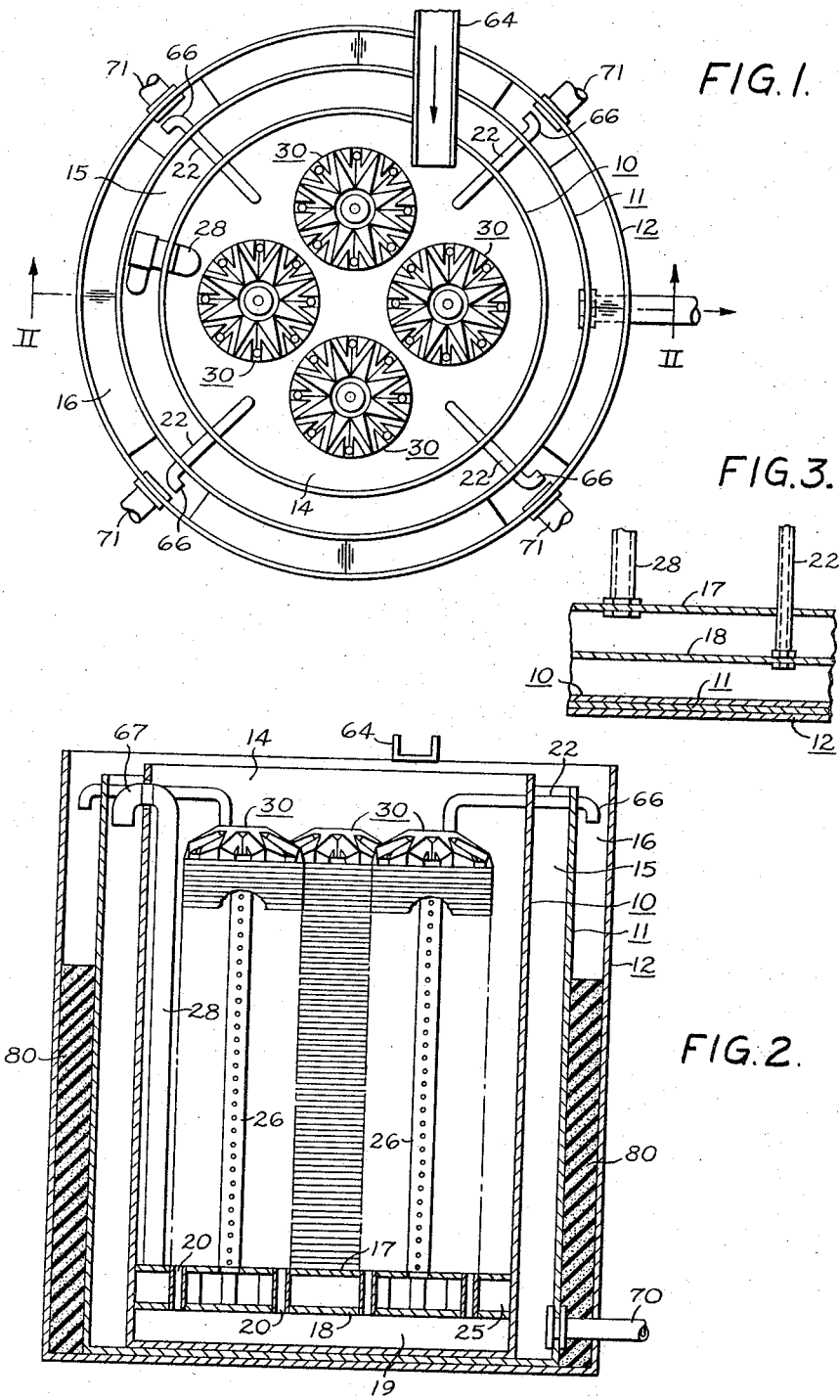

Feb. 28, 1967  R. E. FROMSON ETAL  3,306,456
SETTLING APPARATUS

Filed Sept. 16, 1964  3 Sheets-Sheet 3

United States Patent Office 3,306,456
Patented Feb. 28, 1967

3,306,456
SETTLING APPARATUS
Robert E. Fromson and Darl C. Washburn, Jr., Pittsburgh, Pa., assignors to Westinghouse Electric Corporation, East Pittsburgh, Pa., a corporation of Pennsylvania
Filed Sept. 16, 1964, Ser. No. 396,912
4 Claims. (Cl. 210—256)

This invention relates to separating apparatus, and more particularly to such apparatus of the settling type.

Settling apparatuses have been proposed heretofore for separating components of a fluid mixture which employ a plurality of settling zones defined by parallel array of thin-wall inclined members between which a heavier fluid, or fluidized solid matter settles out of a lighter fluid or fluidized solid matter by gravity and flows downwardly to a common sludge sump beneath such array, while the lighter component rises to the top of such members and is withdrawn via output header means.

It appears that such prior art apparatuses have been less than highly successful, and it is speculated that such modest degree of success may be accounted for in details of their construction which afford opportunity for currents of liquid to disturb the settling action of the solid particles. Accordingly it is an object of the present invention to provide an improved settling device of the parallel tray type which is so constructed and arranged as to discourage creation of such settling-disturbing currents.

Further, such prior art apparatuses are characterized by a construction which is somewhat difficult to install and mount on such as a floor, and it is another object of the present invention to provide a settling device which is of a construction that can be installed and mounted on a flat surface with relative ease.

Still further, prior art parallel-tray settling apparatuses have employed considerable vertical spacing between trays, which contribute to the overall height of such apparatuses, and accordingly one construction of the present invention contemplates a reduction in overall height of the apparatus by a closer settling tray spacing than heretofore employed.

In accord with general features one embodiment of the present invention for separating gravity-settling solid particles from a liquid the several chambers, i.e. the input-liquid, sludge, and liquid-output chambers are arranged coaxially and realized by a simple nested arrangement of three cylindrical open-top tanks of different respective diameters. This presents a circular flat-bottomed configuration which may find simple support by resting on a flat surface such as that of a floor.

To enhance separation between the incoming fluid mixture being treated and the heavier portion settling out of such mixture, the present invention employs a settling tray configuration which presents a dual-incline path for the upward flow of the lighter fluid component and the downward flow of the heavier fluid component which may be predominantly solid matter likened unto an upwardly tilted V-shaped trough which acts to gather the downwardly-moving heavier component from both trough faces and channel the aggregate from such face downwardly along the inclined apex of such trough. These so-called tilted troughs are formed as circumferentially-spaced-apart convolutions in each of a stack array of self-spacing thin-wall generally conical members disposed in the center tank and so constructed and arranged as to receive the incoming fluid mixture in circumferential peripheral regions of such members in the vicinity of the side walls of the upwardly extending convolutions and to gather the settling components of the mixture at the bottom of the troughs near the outer perimeter of each member and direct same downwardly via vertically-aligned baffled openings into a cylindrical header chamber at the bottom of such innermost tank. Where the settling component is in the form of sludge, it is caused to flow from the bottom header chamber to an outermost annular sludge-accumulator chamber formed between the intermediate tank and the outermost tank. By constructing at least the outermost tank of translucent or transparent material, such as polyethylene, the sludge level is clearly observed to apprise the operator as to need for removal of such sludge.

It is contemplated that certain features of the invention, such as the novel settling tray configuration and close-space array thereof, for example, may be employed to advantage for separating particles from either a liquid or a gas, or from separating one liquid from another in a mixture thereof; the essential qualification being that the one component will settle out from the other by gravity.

Other objects, features, and advantages of the invention will become apparent from the following detailed description thereof, when taken in connection with the accompanying drawings, in which:

FIGURE 1 is a plan view of an illustrative embodiment of the invention for use with a particle-containing liquid input;

FIG. 2 is a vertical section view taken along the line 2—2 in FIG. 1;

FIG. 3 is a fragmental view in elevation showing certain details of construction of header chambers employed in the apparatus of FIGS. 1 and 2;

Figure 4:
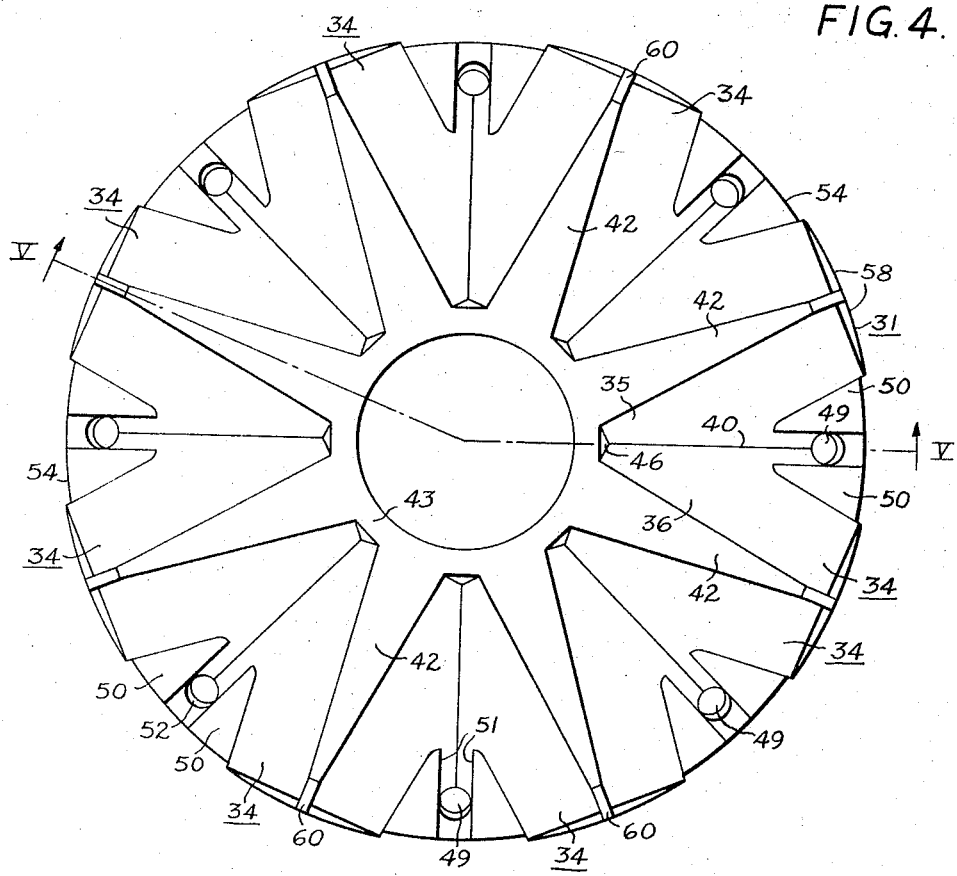
FIG. 4 is a plan view of a conical settling tray constructed in accordance with the present invention.

Referring to FIGS. 1 and 2 in the drawings, an exemplified settling apparatus constructed in accord with the present invention comprises three open-top cylindrical tanks 10, 11 and 12 of different diameters placed one within the other to define a central input-liquid chamber 14, encircled successively by an annular liquid-output storage chamber 15, formed between the innermost tank 10 and the intermediary tank 11, and an annular sludge-storage chamber 16, formed between the intermediary tank 11 and the outermost tank 12. At the bottom of the innermost tank 10 there are two parallel vertically-separated circular partitions 17 and 18. The lower partition 18 cooperates with the bottom of the tank 10 and the cylindrical wall thereof to define a sludge header chamber 19 which receives sludge, in a manner to be described, from a plurality of vertical sludge-conveyor tubes 20 extending from the bottom of chamber 14, through both partitions 17 and 18, and into the top of such sludge header chamber, whence such sludge is transferred to the annular sludge-storage chamber 16 via a number of sludge-transfer syphon tubes 22 which extend upwardly from chamber 19, through partitions 17 and 18, through the input-liquid chamber 14, across the top edges of tanks 10 and 11 to the top of such chamber 16 for discharge thereto. The upper partition 17 cooperates with the bottom partition 18 and with the inner cylindrical wall of the tank 10 to define an output-liquid header chamber 25 which receives output-liquid from a number of vertical output-liquid pipes extending downwardly in chamber 14 through partition 17. Each of the pipes 26 is perforated to receive the output-liquid from the tops of each of the settling trays of the apparatus, as will be described, and such output-liquid is transferred from the header chamber 25 to the annular output-liquid storage chamber 15 via an output-liquid transfer syphon pipe 28 which extends upwardly through partitions 17 and chamber 14, across through the wall of tank 10, to a discharge end near the top of such chamber 15.

Referring to FIGS. 1 and 2, the apparatus comprises a plurality of vertically-spaced-apart parallel arranged vertical arrays 30 of settling trays or members disposed in the liquid-input chamber 14. Each tray 31 is in the general form (FIGS. 4 and 5) of a thin-wall, hollow, frustrated, convoluted cone with stacks one-on-top-of-the other to form vertical cylindrical columns resting on the partitions 17 in encirclement of the perforated output-liquid pipes 26, respectively. Each of the settling trays or members 31 has formed integrally therein a plurality of inclined V-shaped troughs 34 spaced apart circumferentially, there being eight shown in the settling member of FIG. 4. Each trough 34 has slanted side walls 35 and 36 which slope downwardly toward each other in the circumferential direction of the conical tray member and intersect each other at an apex line 40 or trough bottom which slopes upwardly in the radial inward direction of such member, at an angle of 45°, for example, as shown in FIG. 5. Each trough also diverges at the top from its upper inner-radial end to its lower outer-radial end. The upper edges of each trough 34 intersect with trough-interrupted portions 42 of a conical surface of the settling member which extend radially outward and downward in spoke-like fashion from a ring-like juncture portion 43 at their upper ends. The slope of such portions 42 is less than that of the trough bottom 40, 30° for example, and the upper end of such trough bottom 40 is recessed downwardly from the juncture portion 43 of the conical surface and is terminated at such ends by a small triangular-shaped substantially vertical wall 46. At each such upper-trough-end location, as may be seen in FIG. 5, adjacent trays of a stack 30 abut one another to become self-spacing at their upper ends for providing clearance way 48 therebetween to permit passage of liquid therethrough.

The lowermost end of each trough bottom 40 terminates at a vertical sludge-exit port 49 which are vertically aligned with corresponding ports in a vertical stack 30 of members 31 to pass downwardly-migrating sludge or solid particles from the trough into the sludge header chamber 19 (FIG. 2) by way of the tubes 20, the upper ends of which project into the ports 49 of the bottommost settling member 31 of each stack 30. At each side of each port 49 the top of member 31 has raised sludge-wall-defining portions 50 which define vertical guide walls 51 to assist in directing and localizing downward travel of sludge from the bottom of the respective trough into such port. In the vicinity of each port 49, the member 31 has formed therein a half-cylinder baffle 52 which extends downwardly to cooperate with the corresponding baffle on the lower adjacent member to form a continuous downwardly-extending baffle to assist in the conveying of sludge to chamber 19. At the outer periphery of each member 31, in the vicinity of each port 49 and extending for a circumferential distance equal to the span of the sludge-wall-defining portions 50, a liquid-ingress-preventing baffle 54 is formed which extends downwardly at such angles as to sealingly cooperate with the corresponding baffle on the lower adjacent member 31 of a stack 30 and prevent radially-inward entrance of liquid at such location as would tend to disturb the migration of sludge into the port. At the same time, such contacting between adjacent baffles 54 gives self-spaced support between adjacent members 31 at their outer edges.

To provide for quiescent, smooth, non-agitated admission of liquid into the troughs 34 via the clearanceway 48 between members 31 at their outer edge, each member 31 has formed therein downwardly-directed inlet baffles 58 which extend circumferentially between the baffles 54 and upwardly into intersection with the sloping side walls 35 and 36 of the troughs 34. The baffles 58 are offset radially-outward from the baffles 54 and extend vertically at such an angle as to remain separated from the corresponding baffles of the adjacent members, as seen in FIG. 5, which provides non-direct access to the clearanceway 48 in the vicinity of the lower ends of the troughs 34 at opposite sides of the port-protecting baffles 54. In one experimental assemblage, where each member 31 was formed of semi-stiff plastic material, twenty mils thick and spaced apart about fifty mils thick it was found that contact between the baffles 58 occurred in places, and it was deemed sufficient that only every fourth member of the stack have such baffles; the baffles 58 of the intermediate members were removed or deleted.

Affiliated with the baffles 58, there is formed in the member 31 a plurality of narrow spacer ribs 60, one extending downwardly at the outer terminus of each of the conical surface portions 42. These spacer ribs extend upwardly at a steep slope, 6° from the vertical, for example, so as to locally contact corresponding ribs in adjacent members 31 of a stack 30 for additional self-spacing support between such members.

In operation of the settling apparatus of the present invention, the chamber 14 will be filled with particle-suspending liquid, such as a metal-hydroxide-suspending electrolyte solution used in electro-chemical machining, for example, as fed thereto by way of such as the input trough 64 shown in FIGS. 1 and 2. As the level of liquid in chamber 14 rises above the discharge ends of the syphon pipes 22 and 28, which are provided with elbows 66, 67, respectively, at such ends to permit adjustment of the height of such ends, a limited hydraulic pressure head is established which encourages the liquid in chamber 14 to enter the peripheral edges of the stacks 30 and to pass radially-inward and upward via the clearance spaces 48 between the settling members 31 thereof to the perforated output-liquid pipes 26 at the center of such stacks, thence to the header chamber 25, and via the syphon pipe 28 and its adjustable outlet elbow 67 to the annular output-liquid storage chamber 15. Such passage of liquid through the stacks 30 enters between the baffles 58 of the convoluted conical settling members 31, rises upwardly therebetween to the clearanceway 48 between the side walls 35 and 36 of the troughs 34; while the baffles 54 act to prevent entrance of such liquid in the vicinity of the sludge ports 49. The liquid then travels upwardly and radially-inward along such walls to gain access to the perforated pipes 26 at the interior of the stack by way of the clearanceway between the conical surface portions 42 of the members. The substantially vertical triangular walls 46 at the upper ends of the troughs block direct communication between the interior of the stack and such upper ends. During such migration of liquid upwardly and inwardly along the trough walls 35 and 36, gravity causes particles suspended in the liquid to settle and gather at the bottom 40 of each of the troughs 34, which, in being slanted downwardly, directs the accumulated particles to the respective vertically aligned sludge exit ports 49, which direct such sludge or heavily-particle-laden liquid downwardly to the sludge header chamber 19 by way of the tubes 20 in registry with such ports. Such passage of sludge downwardly through the aligned ports 49, in addition to the effect of gravity, is encouraged to a degree by a limited hydraulic syphon pressure head created by virtue of the discharge end elbows 66 of the syphon pipes 22 being located below the level of the liquid in chamber 14. Sludge from the header chamber 19 is automatically transferred to the outermost annular chamber 16 by way of the syphon pipes 22 during addition of liquid to chamber 14, once chamber 14 has been filled. The wall of outer tank 12 is higher than the wall of intermediate tank 14, which in turn is lower than the wall of the innermost tank 10. As sludge exits by way of the syphon pipes 22, further settling occurs in the annular chamber 16 which separates to a relatively clear liquid at the top and thick, dense sludge at the bottom, so that once the chamber 16 is filled, entrance of sludge thereinto from the syphon pipes 22 may cause spillover of the relatively clear liquid at the top over into the top of the liquid-output chamber 15; presuming that such is permitted by withdrawal of liquid from chamber 15 by way of a liquid-output pipe 70, which is compensated for by regulation between input to the chamber 14 and output from the chamber 15.

During removal of sludge from the chamber 16, such as periodically, it is preferred to remove same from the bottom, as by a sludge outlet pipe 71, for example, while maintaining the liquid level in such chamber by addition of clear liquid at the top by such as external means not shown.

From the foregoing it will be apparent that the pressure differentials which encourage liquid to flow from the liquid-input chamber 14, through the settling stacks 30 to the liquid-output chamber 15 and to the sludge chamber 16 is limited to the level of liquid in chamber 14 which rises above the level of the upper ends of syphon pipes 22 and 28. This, in the construction presently exemplified, is limted to a matter of several inches and assures that migration of liquid through such stack will be sufficiently quiescent to avoid excessively disturbing the particle settling action taking place therein.

In addition to the foregoing description, it has been found that the migration of particles downwardly along the surface of the trays 31 can be faciliated if the thin-wall material of which the tray is composed is a plastic, such as butastyrene, polyvinylchloride, polypropylene, etc., which apparently affords an inherent self-lubricating characteristic that prevents the particles from adhering to the tray surfaces. Depending upon the nature of the particles being settled out, however, in other instances a smooth-surfaced metal such as stainless steel has been found suitable.

Figure 6:
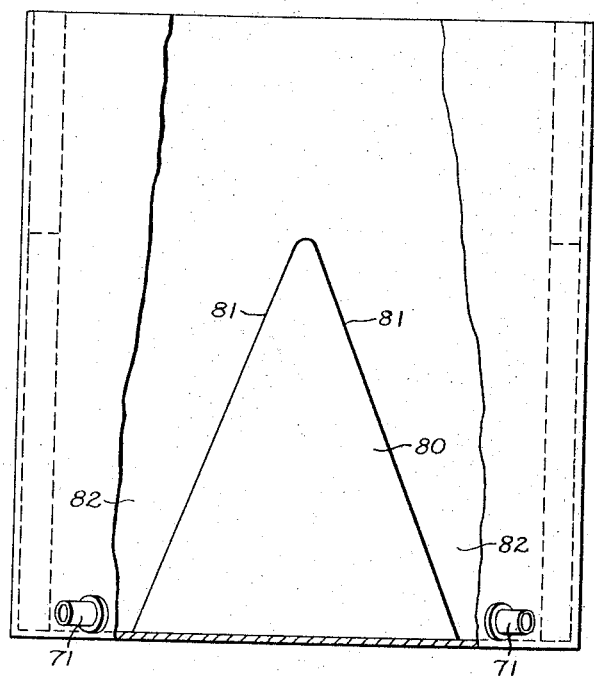
FIG. 6 is a cut-away view in elevation showing a sludge-trough-forming liner employed in the nested tank construction shown in FIGS. 1 and 2.

Also, in addition, in the apparatus of FIGS. 1 and 2, the gathering of the sludge and its removal from the annular sludge-storage chamber 16 between the two outer tanks 11 and 12 can be facilitated, as shown in FIG. 6, by providing a plurality of sludge outlet pipes 71, equal in number to the sludge discharge elbows 66 and disposed therebeneath, respectively, and providing a triangular-shaped barrier member 80 between adjacent pipes 71. Due to the slope of the side edges 81 of the barriers 80, a trough 82 is formed therebetween which funnels the sludge toward the inlet end of the sludge discharge pipes. The barriers 80 may be made conveniently from a sheet of resilient foam material, such as polyurethane, and inserted between the outer two tanks 11 and 12. By making the barriers 80 of limited height, circulation above the troughs 82 is afforded.

Figure 5:
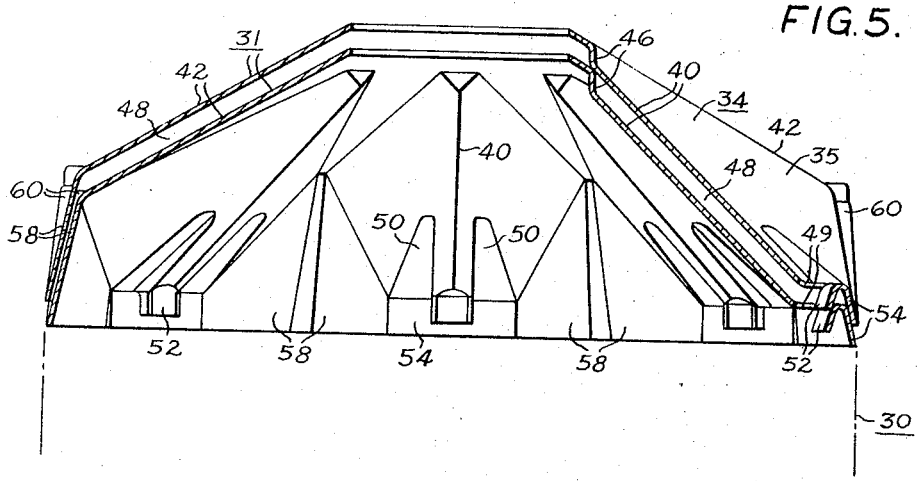
FIGURE 5 is a vertical section taken along the line 5—5 in FIG. 4 showing cooperative relationships betwen different sections of adjacent settling trays in stacked array as employed in the apparatus of FIGS. 1 and 2.

Referring to FIGS. 4 and 5, by way of further description, in behalf of preventing stirring of the accumulated particles or sludge traveling downwardly along the troughs 34 to the sludge-exit ports 49 it is preferable that the guide walls 51 are of such slope as to partially nest in the corresponding walls of the immediately-adjacent trays 31 in the vertical stack 30 to provide radially-extending barriers to prevent entry of input liquid circumferential-wise into the bottom of such troughs 34 in the vicinity of such sludge-exit ports 49.

Figure 7:
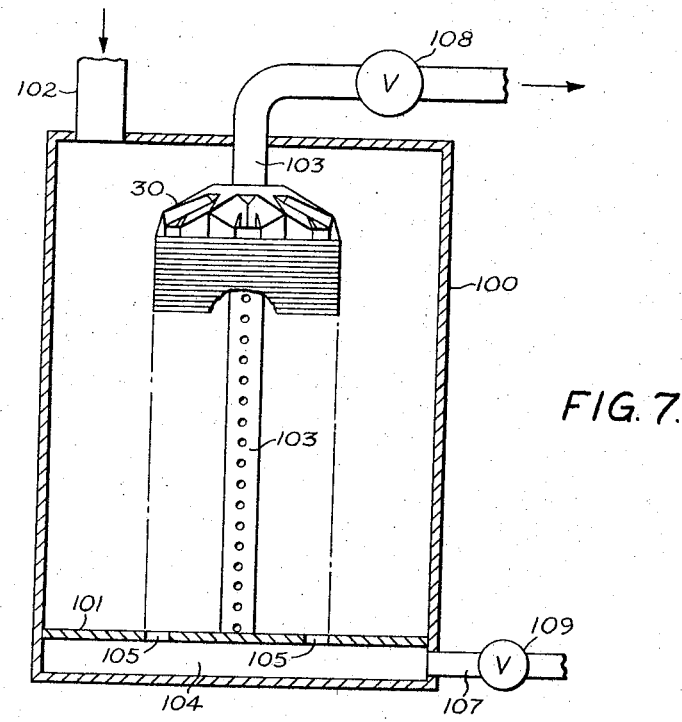
FIG. 7 is a vertical section view of an embodiment of the invention for use with a gaseous input.

Referring to FIG. 7, for separating gravity-settable particles from a gas, such as air, for example, the apparatus may comprise a closed tank 100 having a bottom partition 101 on which one or more vertical arrays 30 of the novel setting trays rest. The particle-contaminated gas or air is fed into the interior of the tank 100 via an inlet duct 102 for access to the clearanceways between the trays, as will be understood from the previous description, to cause the air or gas, rather than the clear liquid as aforedescribed, to migrate upwardly between the trays to be gathered by a central perforated gas outlet pipe 103 likened to the pipe 26 of FIG. 2, and the particles migrate downwardly to a particle-receiving header chamber 104 beneath the partition 101 via the aligned ports 49 around the circumference of the array and tubes 105 in registry with such ports. The tubes 105 are identical to the tubes 20 hereinbefore referred to as sludge-conveyor tubes in the case of the apparatus as previously described for use with particle-contaminated liquid. The gas outlet pipe 103, which is perforated within the domain of the tray array 30, may continue above such array in closed-wall form to the exterior of the tank 100 for withdrawal of the clarified gas from the apparatus. The particles of solid matter settled out of the gas and reposing in the chamber 104 may be transferred therefrom via a contaminant discharge pipe 107. Valves 108 and 109 in the pipes 103 and 107, respectively, provide for regulation suitable to desired conditons of operation, such as periodic or continuous withdrawal of accumulated matter from chamber 104.

While there has been shown and described certain illustrative embodiments of the invention, modifications thereto will readily occur to those versed in the art. It is not desired, therefore, that the invention unnecessarily be limited to the specific arrangements shown and described, and it is intended to cover in the appended claims the true spirit and scope of the invention.

We claim as our invention:

1. Settling apparatus comprising three open-top nested cylindrical tanks arranged to define a liquid-input chamber in the center tank and encircling liquid-output and sludge-storage chambers therearound; an array of thin, hollow, frustrated, conical, spaced-apart, convoluted settling members disposed in the innermost tank, convolutions in said members extending radially inward and upward and having at their lowermost portions vertically-aligned openings for downward transmissions of sludge to a common sludge header chamber at the bottom of the innermost tank and being open at their upper ends to a hollow interior of such array; a vertical perforated, liquid-output pipe extending downward through said hollow interior to an output-liquid header chamber at the bottom of said innermost tank; and respective syphon means having inlets to the two header chambers, respectively, and outlets opening into the liquid-output and sludge-storage chambers, respectively, at a level below the top of the innermost tank.

2. A settling tray construction in the form of a thin, hollow, frustrated, conical member, open at its top center to accommodate disposition of an output-fluid gathering pipe when such member is in stacked coaxial vertical array with other such members, said member having formed therein: a plurality of circumferentially-spaced-apart portions which cooperate with corresponding portions of other similar members of such array to afford clearanceway therebetween for passage of fluid from their lower outer radial edges to their upper inner radial centers, a plurality of circumferentially distributed inclined V-shaped troughs which diverge downwardly, a plurality of exit ports at the lowermost portions of such troughs, respectively, and a plurality of baffles respective to such ports for shielding same locally against direct exposure to the outer rim of such members.

3. A settling tray construction as set forth in claim 2, further including integrally-formed substantially-vertical baffles at the outer rim of such member for cooperation with corresponding baffles of other similar members of a stack thereof to prevent direct radial access of the lower ends of such troughs to the outer rim of such member.

4. Gravity settling apparatus for settling out matter from a fluid which is lighter than said matter, said apparatus comprising a tank for receiving the fluid to be treated; upright settling tray stack means disposed within said tank; said settling tray stack means comprising a plurality of parallel and coaxially aligned substantially frustoconical thin-wall, hollow settling trays, each settling tray having a central opening at its narrow end in vertical alignment with the central openings of the other settling trays in the stack, spacer means providing clearance for the passage of fluid radially between adjacent trays as fluid is admitted to the tank, a plurality of circumferentially-distributed divergent inclined troughs extending radially and axially from said narrow end and terminating respectively in circumferentially-spaced exit ports at the wide end of the tray and at the apex of said troughs, corresponding exit ports of the trays being vertically aligned for vertical transmission of fluids, and separate means for collecting fluid common to said circumferentially-spaced exit ports and to said central openings, respectively.

References Cited by the Examiner

UNITED STATES PATENTS

| | | | |
|---|---|---|---|
| 629,277 | 7/1899 | Slack | 137—140 X |
| 660,151 | 10/1900 | Dorval | 137—140 X |
| 2,720,314 | 10/1955 | Booth | 210—323 X |
| 2,901,114 | 8/1959 | Smith et al. | 210—256 X |

FOREIGN PATENTS

| | | |
|---|---|---|
| 72,007 | 11/1893 | Germany. |
| 117,538 | 2/1901 | Germany. |

REUBEN FRIEDMAN, *Primary Examiner.*

J. DE CESARE, *Assistant Examiner.*